(No Model.)

J. WALSH, Jr.
NUT LOCKING DEVICE.

No. 514,397.  Patented Feb. 6, 1894.

WITNESSES
R. Schleicher
Murray C. Boyer

INVENTOR
James Walsh Jr.
By his Attorneys
Howson & Howson

UNITED STATES PATENT OFFICE.

JAMES WALSH, JR., OF PHILADELPHIA, PENNSYLVANIA.

NUT-LOCKING DEVICE.

SPECIFICATION forming part of Letters Patent No. 514,397, dated February 6, 1894.

Application filed November 20, 1891. Serial No. 412,560. (No model.)

*To all whom it may concern:*

Be it known that I, JAMES WALSH, Jr., a citizen of the United States, and a resident of Philadelphia, Pennsylvania, have invented certain Improvements in Nut-Locking Devices, of which the following is a specification.

My invention relates to a nut lock in which the clamping power of a washer upon the bolt is relied upon for locking the nut, the object of my invention being to provide a simple and efficient form of such nut locking device for application to a round bolt, said device consisting of a bowled or dished washer, having, oppositely facing semicircular sets of teeth surrounding an opening of the size of the bolt, so that when the washer is depressed by the nut the toothed faces of the same are caused to clamp the bolt as in a vise, a powerful hold of the washer upon the bolt being thus insured, so that when the nut is locked to the washer the unscrewing of said nut is effectually prevented.

Figure 1:
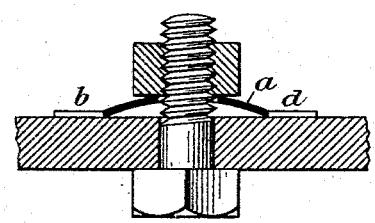
Figure 2:
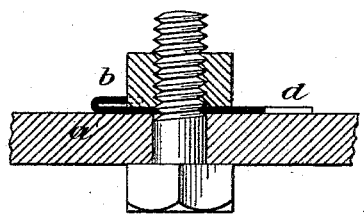
Figure 4:
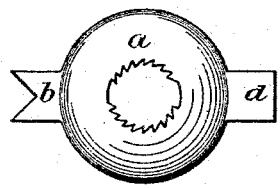
Figure 3:
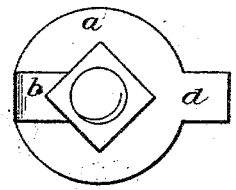
Figure 5:
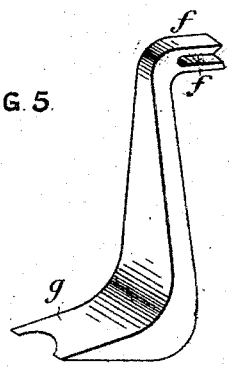

In the accompanying drawings, Figure 1, is a sectional view illustrating my improved nut locking device as it appears before the nut is tightened, showing the washer in its normal bowled or dished form. Fig. 2, is a similar view showing the nut tightened and locked, and the washer flattened so as to clamp the bolt as in a vise. Fig. 3, is a plan view of Fig. 2. Fig. 4, is a plan view of the locking washer. Fig. 5, is a perspective view of a tool used in connection with the nut locking device; and Fig. 6, is a perspective view showing a special form of nut locking finger.

The nut lock shown in Figs. 1 to 4 consists of a bowled or concavo-convex washer $a$ of steel or other resilient metal having a central opening provided with inwardly projecting teeth forming semicircular sets facing in reverse directions, each tooth having an abrupt face to prevent turning of the washer with the nut in the direction in which the latter would have to turn in loosening, the washer being bowled and the teeth formed by the use of a countersunk punch for forming the washer. The washer will slip over the bolt when said washer is in the upwardly dished or bowled form shown in Fig. 1, but when the nut is screwed down upon the washer, as shown in Fig. 2, the flattening of the washer causes an inward projection of the teeth so as to cause them to bite into the bolt with a vise-like action, and with sufficient force to prevent the turning of the washer independently of the bolt, the latter being thus engaged throughout almost the entire extent of its opposite halves by teeth which project forward or in the direction in which the washer would have to be turned by an unscrewing nut if it was locked thereto. In order to effect such locking of the nut to the washer I provide the latter with opposite fingers $b$ and $d$ which normally project outward from the washer, as shown in Figs. 1 and 4, but which are without temper or elasticity, so that they can be bent over and down onto the face of the washer, as shown in Fig. 2, and will retain this position. The finger $b$ is notched at the end so as to engage with either one of the corners or angles of the nut, and the end of the finger $d$ is flat so that it is adapted to engage with either one of the flat sides of the nut, provision being thereby afforded for locking said nut at each one-eighth of a turn.

For turning down or raising the fingers $b$ and $d$ of the washer I use a tool such as shown in Fig. 5, having projecting jaws $f$ for engagement with either of said fingers, and the opposite end of said tool is preferably provided with a tapered foot $g$ so that in the case of a non-resilient washer this tapered foot may, after the removal of the nut, be projected beneath the washer and moved around the bolt so as to raise the outer portion of the washer and restore the same to bowled or dished form for use again.

Figure 6:
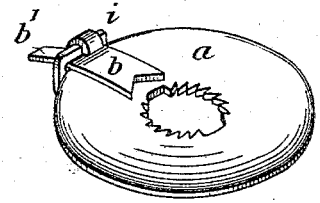

In some cases the locking finger or projection $b$, instead of being part of the washer, may be hung to a bearing $i$ thereon, and may have a projecting tongue $b'$ serving as a spring to retain the finger in locking position, as shown for instance in Fig. 6.

Having thus described my invention, I claim and desire to secure by Letters Patent—

1. The within described nut lock consisting of a dished or bowled washer provided with one or more nut locking fingers and having a central opening with opposite reversely-facing semicircular sets of teeth for embracing and engaging with the opposite sides of the stem of the bolt when the washer is flattened, each of said teeth having an abrupt forward side, substantially as specified.

2. The combination of the dished or bowled washer having a central opening with teeth for engaging with the opposite sides of the bolt when the washer is flattened, and a nut locking finger hung to a bearing on said washer and having a projecting tongue serving as a spring to retain the finger in locking position, substantially as specified.

In testimony whereof I have signed my name to this specification in the presence of two subscribing witnesses.

JAMES WALSH, Jr.

Witnesses:
WILLIAM D. CONNER,
HARRY SMITH.